US011662501B2

United States Patent
Li et al.

(10) Patent No.: US 11,662,501 B2
(45) Date of Patent: May 30, 2023

(54) GEOLOGIC MODELING METHODS AND SYSTEMS HAVING CONSTRAINED RESTORATION OF DEPOSITIONAL SPACE

(71) Applicant: ExxonMobil Upstream Research Company, Spring, TX (US)

(72) Inventors: Guo-Shi Li, Houston, TX (US); Hao Huang, The Woodlands, TX (US); Colin J. Lyttle, Houston, TX (US); Matthias Imhof, Katy, TX (US); Sha Miao, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 962 days.

(21) Appl. No.: 16/354,684

(22) Filed: Mar. 15, 2019

(65) Prior Publication Data

US 2019/0302309 A1 Oct. 3, 2019

Related U.S. Application Data

(60) Provisional application No. 62/786,079, filed on Dec. 28, 2018, provisional application No. 62/652,120, filed on Apr. 3, 2018.

(51) Int. Cl.
*G01V 99/00* (2009.01)
*G01V 1/32* (2006.01)
(Continued)

(52) U.S. Cl.
CPC ............ *G01V 99/005* (2013.01); *G01V 1/325* (2013.01); *G01V 1/345* (2013.01); *G06F 17/142* (2013.01); *G01V 2210/642* (2013.01)

(58) Field of Classification Search
CPC ...... G01V 99/005; G01V 1/325; G01V 1/345; G01V 2210/642; G06F 17/142
(Continued)

(56) References Cited

U.S. PATENT DOCUMENTS

| | | | |
|---|---|---|---|
| 6,106,561 A | 8/2000 | Farmer | |
| 7,480,205 B2 | 1/2009 | Wei | |
| 7,711,532 B2 | 5/2010 | Dulac et al. | |
| 8,315,845 B2 | 11/2012 | Lepage | |
| 9,022,129 B2 | 5/2015 | Dobin et al. | |

(Continued)

FOREIGN PATENT DOCUMENTS

| | | | | |
|---|---|---|---|---|
| CA | 2716414 C | * | 8/2014 | ............. G01V 1/301 |
| CN | 106094029 B | * | 12/2017 | |
| FR | 3036210 A1 | * | 11/2016 | ........... G01V 99/005 |

OTHER PUBLICATIONS

Dominguez_2017 (Semi-automatic mapping for identifying complex geobodies in seismic images, J. Geophys. Eng. 14 (2017). (Year: 2017).*

(Continued)

*Primary Examiner* — Brian S Cook
(74) *Attorney, Agent, or Firm* — ExxonMobil Technology and Engineering Company—Law Department

(57) ABSTRACT

Geologic modeling methods and systems disclosed herein employ fault face parameterization to constrain and improve the transformation of a faulted physical space geologic model into an unfaulted depositional space geologic model. An illustrative embodiment includes: associating a seismic image with each face of at least one fault in a subsurface region; determining a correspondence map between the seismic images for said at least one fault; parameterizing the faces using the correspondence map to match parameter value assignments for corresponding portions of the faces; creating a displacement map that draws together matching (Continued)

parameter values to align the corresponding portions of the faces; applying the displacement map to the geologic model to create a design space model; modifying the design space model; applying the displacement map in reverse to the modified design space model to obtain a modified geologic model; and outputting the modified geologic model.

25 Claims, 5 Drawing Sheets

(51) Int. Cl.
  *G06F 17/14* (2006.01)
  *G01V 1/34* (2006.01)
(58) Field of Classification Search
  USPC .......................................................... 703/10
  See application file for complete search history.

(56) References Cited

U.S. PATENT DOCUMENTS

| 10,107,938 | B2 | 10/2018 | Huang et al. |
| 2013/0246031 | A1* | 9/2013 | Wu .......................... G01V 99/00 |
| | | | 703/10 |
| 2016/0124117 | A1* | 5/2016 | Huang .................... G06T 17/05 |
| | | | 703/2 |

OTHER PUBLICATIONS

Ofuyah_2014 (The Application of Fourier Transform in the Interpretation of Subsurface Stratigraphy, Jan. 2014). (Year: 2014).*

Hennegan_2017 (Using sum notation to represent iterative algorithms—intuition, Matthew Hennegan, Aug. 19, 2017 Youtube.com/watch?v=Swplxm3fa04). (Year: 2017).*

Floater et al. (2005) "Surface Parameterization: A Tutorial and Survey", Advances in Multiresolution for Geometric Modelling, 2005 Springer Verlag, pp. 157-186.

* cited by examiner

GEOLOGIC MODELING METHODS AND SYSTEMS HAVING CONSTRAINED RESTORATION OF DEPOSITIONAL SPACE

CROSS-REFERENCE TO RELATED APPLICATION

This application claims the benefit of (i) U.S. Provisional Application No. 62/786,079, entitled "Geologic Modeling Methods and Systems Having Constrained Restoration of Depositional Space" that was filed Dec. 28, 2018, and (ii) U.S. Provisional Application No. 62/652,120, entitled "Geologic Modeling Methods and Systems Having Constrained Restoration of Depositional Space" that was filed on Apr. 3, 2018, the disclosures of which are incorporated herein by reference.

The present application also relates to U.S. patent application Ser. No. 14/928,527, entitled "Managing Discontinuities in Geologic Models" that was filed on Oct. 30, 2015 and granted as U.S. Pat. No. 10,107,938, the disclosure of which is hereby incorporated herein by reference.

TECHNICAL FIELD

The present application relates generally to methods and systems for creating geologic models of a subsurface region, and in particular models that addresses discontinuities in subsurface regions. The models may be used for hydrocarbon operations, such as hydrocarbon exploration, hydrocarbon development, and/or hydrocarbon production operations.

BACKGROUND

A geologic model is a computer-based three-dimensional ("3D") representation of a region beneath the earth's surface. Such models can be used to model a petroleum reservoir, a depositional basin, or other subsurface regions which may have valuable mineral resources. Once the model is constructed, it can be used for various purposes, many of which are intended to facilitate efficient and economical recovery of the valuable resources. For example, the geologic model may be used as an input to petroleum reservoir simulations, which are used to plan well placements and predict hydrocarbon production from a petroleum reservoir over time.

It can be challenging to develop a geologic model, as such models often involve many distinct depositional objects (sometimes referred to as, geologic bodies or "geobodies"), each having relatively consistent or gradually varying properties internal to the object, any or all of which may exhibit an abrupt transition at the boundaries of the object. The geologic model provides a volumetric representation of these properties, resulting in an n-dimensional ("nD") space that is often populated by separately assigning property values to each geobody. The presence of faults, slips, and other discontinuities may undesirably multiply the number of distinguishable geobodies in the model beyond what is convenient or manageable by the persons or systems populating the volumetric properties of the model.

To address this issue, U.S. Pat. No. 10,107,938, which is hereby incorporated herein by reference, seeks to reduce the number of distinct geobodies by establishing a map from a physical space representing the current subsurface structure to a design space representing the original state of the geobodies as they were formed by deposition. (For this reason, the design space is also known as the "depositional space".) Importantly, the mapping attempts to "heal" any discontinuities, restoring all geobodies from their current faulted and segmented state to a continuous (un-faulted) unified state. The mapping is performed in manner that minimizes deformation and preserves in the design space the resemblance to the physical space. This mapping is then used to facilitate the populating of the design space with the material properties.

For example, in geologic modeling of a subsurface region, a 3D model domain is delineated by horizons and faults, where horizons are primarily flat horizontal surfaces related to deposition of sediment material forming a reservoir rock, and faults are discontinuities in the rock introduced by non-depositional events. The material properties, such as density, porosity, permeability, and other rock properties, may be described in a continuous volume in the design space by the user or modeler. Thereafter, a reverse-mapping can then be used to populate the physical space of the subsurface model even though it is a discontinuous volume that includes discontinuities in the form of post-depositional faults.

The design space may also or alternatively be used by modeling systems and methods that "fill in" additional detail beyond what can be derived from seismic survey data or well logs. For example, U.S. Patent Application Publication No. 2013/0246031, which is hereby incorporated herein by reference, sets forth a detailed modeling process that includes: mapping the measurement data representing the physical reservoir into a continuous (i.e., un-faulted) "design space", fitting surfaces to the measurement data in design space, combining the surfaces to form region boundaries (thereby defining different regions and the interfaces between them), setting formation properties within each region, and mapping the resulting structures from design space back to the physical space thereby obtaining a geologic model suitable for evaluating various strategies for well-placement and production by simulating the resulting reservoir fluid movements.

The physical-to-design space mapping technique is useful enough that various techniques have been proposed for generating the mapping, including the methods disclosed in U.S. Pat. Nos. 6,106,561; 7,480,205; 7,711,532; and 8,315,845. The methods in these references rely on corner-indexing based approximations; user-specified displacement vectors; relatively flat, parallel horizons; and/or heuristic constraints, and accordingly these methods may be tedious, may produce inconsistent results, and/or may yield an undesirable degree of deformation.

Therefore, there remains a need for improved methods and systems that can provide a subsurface geologic model that addresses discontinuities in a subsurface region. In particular, there remains a need for improved methods and systems for transforming faulted physical space models into unfaulted depositional space models.

SUMMARY

Disclosed herein geologic modeling methods and systems employing fault face parameterization to constrain and improve the transformation of a (faulted) physical space geologic model into an unfaulted depositional space geologic model. For example, one or more embodiments may include: obtaining a geologic model representing a faulted subsurface region in physical space; associating a seismic image with each face of at least one fault in the subsurface region; determining a correspondence map between the seismic images for said at least one fault; parameterizing the faces using the correspondence map to match parameter value assignments for corresponding portions of the faces; creating a displacement map that, when applied to the geologic model, draws together matching parameter values to align the corresponding portions of the faces; applying the displacement map to the geologic model to create a design space model; modifying the design space model; applying the displacement map in reverse to the modified design space model to obtain a modified geologic model; and outputting the modified geologic model. The modified geologic model may be suitable for use in one or more hydrocarbon operations, such as hydrocarbon exploration, development, or production operations. For example, the modified geologic model may be suitable for use in evaluating one or more well placement(s) and/or evaluating one or more production strategies.

One or more geologic modeling systems described herein may include: a memory having geologic modeling software; and one or more processors coupled to the memory to execute the geologic modeling software. The software causes the one or more processors to implement the foregoing method.

One or more illustrative geologic modeling software product embodiments described herein may include computer readable program code residing on a non-transitory information storage medium, which when executed implements the foregoing geologic modeling method.

Each of the foregoing embodiments may be employed individually or conjointly, and may further employ one or more of the following features in any suitable combination.

For example, in one or more embodiments, associating a seismic image with each face of at least one fault in the subsurface region may include extracting pixel values from where offset surfaces intersect a volumetric model, the offset surfaces extending parallel to said at least one fault. In some embodiments, the pixel values may represent reflection intensity derived from migrated seismic survey traces.

In one or more embodiments, determining a correspondence map between the seismic images for said at least one fault may include digital image correlation via fast Fourier transforms.

In one or more embodiments, parameterizing the faces using the correspondence map to match parameter value assignments for corresponding portions of the faces may include: assigning matching parameter values to nodes along corresponding intersections of a horizon with said at least one fault; and solving a diffusion equation to assign parameter values to any nodes without assigned parameter values on at least one face of said at least one fault. In some embodiments, the parameterizing may further include: identifying any merged horizons associated with a pinch-out proximate to said at least one fault; assigning matched parameter values to nodes representing an intersection of the merged horizons with said at least one fault. In one or more embodiments, said parameterizing may further comprise identifying one or more intersection points for a polyline, surface, or body representing a fault-intersecting feature (such as for a pinch-out or for a central axis of a geobody) with each face of said at least one fault, and using a constraint to compel matching parameter values for the intersection points or increasing a mismatch penalty weight for the intersection points.

In one or more embodiments, creating a displacement map that, when applied to the geologic model, draws together matching parameter values to align the corresponding portions of the faces may include increasing a mismatch penalty weight for said nodes representing the intersection of the merged horizons with said at least one fault. In some embodiments, said creating may further include solving one of an energy optimization equation and conservation law equation based on parameterized nodes on the fault faces to relate points in the physical space to points in the design space.

In one or more embodiments, modifying the design space model may include assigning values of one or more formation properties to geobodies in the design space.

Figure 1:
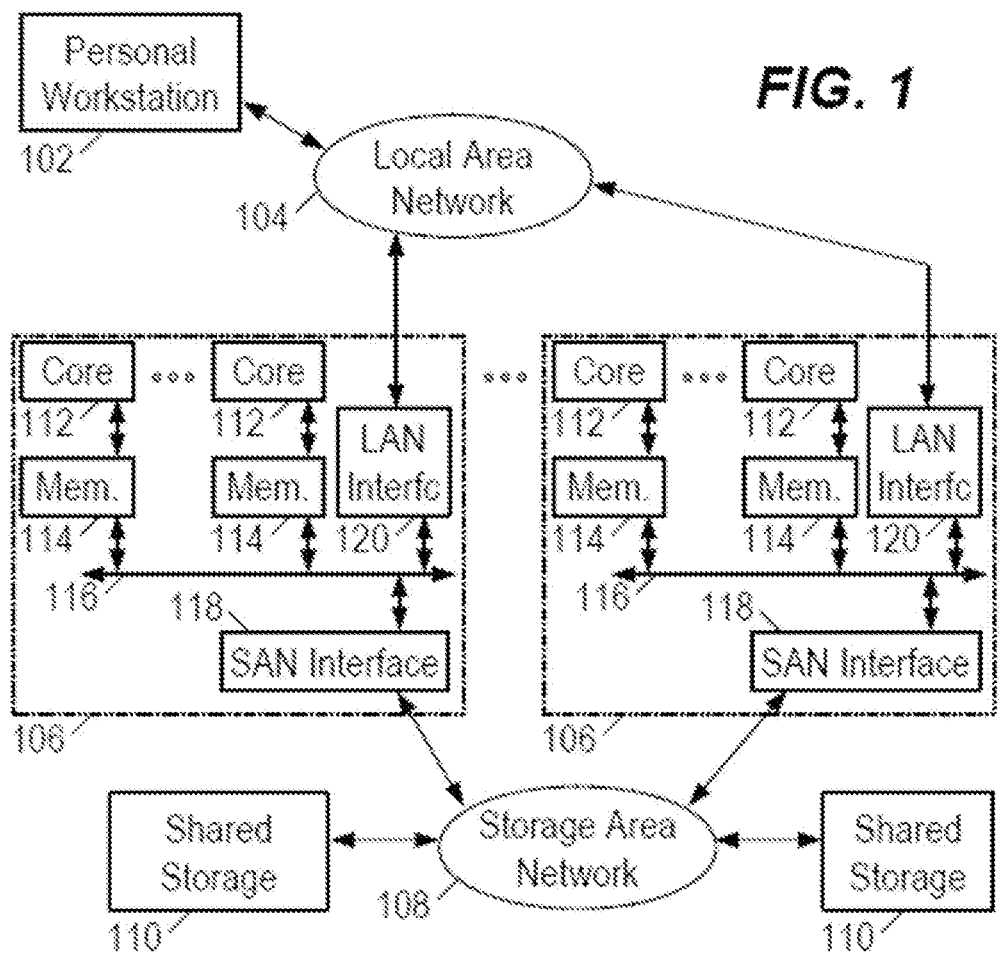
FIG. 1 is block diagram of an illustrative geologic modeling system having constrained restoration of depositional space.

It should be understood that the drawings and corresponding detailed description do not limit the disclosure, but on the contrary, they provide the foundation for understanding all modifications, equivalents, and alternatives falling within the scope of the appended claims.

NOMENCLATURE

Various terms as used herein are defined below. To the extent a term used in a claim is not defined below, it should be given the broadest possible definition persons in the pertinent art have given that term as reflected in at least one printed publication or issued patent.

As used herein, the term "basin modeling" refers generally to any method or analysis which provides a representation of the history of a sedimentary basin or other subsurface section of interest and/or an estimate of timing of any component of a hydrocarbon system. For example, a basin model may be used to model, but is not limited to, a burial history, time a specific subsurface location or layer reached a certain temperature or maturity, time for how long a location was in a certain temperature range, timing of expulsion, timing of migration, and/or timing of accumulation. Generally a basin model is based on and/or constrained by measured or derived data representing present day conditions (e.g., stratigraphy, current bottom hole temperature, heat flow) or a condition in the past (e.g., water depth) on which a model of the past history of the area of interest is based.

As used herein, the term "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of data to identify preferred development approaches and methods. Accordingly, hydrocarbon development may include modeling of subsurface formations and extraction planning for periods of production, determining and planning equipment to be utilized and techniques to be utilized in extracting hydrocarbons from the subsurface formation, and the like.

As used herein, the term "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration may include acquiring measurement data, modeling of the measurement data to form subsurface models, and determining likely locations for hydrocarbon reservoirs within the subsurface. The measurement data may include seismic data, gravity data, magnetic data, electromagnetic data, and the like.

As used herein, the term "hydrocarbon operations" refers to any activity associated with hydrocarbon exploration, hydrocarbon development, and/or hydrocarbon production. For example, hydrocarbon operations may comprise hydrocarbon management or managing hydrocarbons, which may include hydrocarbon extraction, hydrocarbon production, hydrocarbon exploration, identifying potential hydrocarbon resources, identifying potential well locations (such as injection and/or production wells), determining well injection and/or extraction rates, identifying reservoir connectivity, acquiring hydrocarbon resources, disposing of and/or abandoning hydrocarbon resources, reviewing prior hydrocarbon management decisions, and any other hydrocarbon related acts or activities.

As used herein, the terms "hydrocarbon production" or "producing hydrocarbons" refer to any activity associated with extracting hydrocarbons from a subsurface location through a well or other opening. Hydrocarbon production normally refers to any activity conducted to form the wellbore along with any activity in or on the well after the well is completed. Accordingly, hydrocarbon production includes not only primary hydrocarbon extraction, but also secondary and tertiary production techniques, such as injection of gas or liquid for increasing drive pressure or mobilizing the hydrocarbons; treating the well by, for example, chemicals or hydraulic fracturing the wellbore to promote increased flow; well servicing; well logging; and other well and wellbore treatments.

As used herein, the term "geologic model" refers to a model, such as a computer-based representation, of a subsurface earth volume, such as a petroleum reservoir or a depositional basin. Geologic models may take on many different forms. Depending on the context, descriptive or static geologic models built for petroleum applications can be in the form of a 2-D or 3-D array of cells, to which geologic and/or geophysical properties such as lithology, porosity, acoustic impedance, permeability, or water saturation are assigned (such properties are referred to collectively herein as "reservoir properties"). Many geologic models are constrained by stratigraphic or structural surfaces (for example, flooding surfaces, sequence interfaces, fluid contacts, and/or faults) and boundaries (for example, facies changes). These surfaces and boundaries define regions within the model that possibly have different reservoir properties.

As used herein, "geomechanical model" is a model (e.g., a two-dimensional model or a three-dimensional model) of the subsurface that contains properties, such as static properties, and may model responses to changes in stress, such as mechanical response. The static properties may include properties, such as rock compressibility and Poisson's ratio, while the mechanical response may include compaction, subsidence, surface heaving, faulting, and seismic event, which may be a response to of the rock to fluid injection and extraction operations.

As used herein the term "region of interest" refers to an area or volume of geologic interest, and may be associated with the geometry, attitude, and arrangement of the area. A region of interest may have characteristics such as folding, faulting, cooling, unloading, and/or fracturing that has occurred therein. In the context of a subsurface model, a region of interest may be represented as a contiguous part of the model, such as a contiguous two-dimensional or three-dimensional part of the model. In some embodiments, the region of interest may refer to an interval or compartment within a reservoir where hydrocarbons, non-hydrocarbon gases, and/or water may reside.

As used herein, the term "reservoir model" is a model (e.g., a two-dimensional model or a three-dimensional model) of the subsurface that in addition to static properties, such as porosity and/or permeability, also has dynamic properties that vary over the timescale of resource extraction, such as fluid composition, pressure, and/or relative permeability.

As used herein, the term "subsurface model" refers to a model of a subsurface region and may include a reservoir model, a geomechanical model, a watertight model, and/or a geologic model. The subsurface model may include subsurface data distributed within the model in two-dimensions (e.g., distributed into a plurality of cells, such as elements or blocks), three-dimensions (e.g., distributed into a plurality of voxels), or four or more dimensions. In preferred embodiments, the subsurface models described herein are two-dimensional or three-dimensional models.

DETAILED DESCRIPTION

Various specific embodiments, versions, and examples of the invention will now be described, including preferred embodiments for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The methods and improvements disclosed herein may be embodied in a computer-based system as shown in FIG. 1. The illustrative geologic modeling system includes a personal workstation 102 coupled via a local area network (LAN) 104 to one or more multi-processor computers 106, which are in turn coupled via a storage area network (SAN) 108 to one or more shared storage units 110. Personal workstation 102 serves as a user interface to the geologic modeling system, enabling a user to load data into the system, to configure and monitor the operation of the system, and to retrieve the results (often in the form of image data) from the system. Personal workstation 102 may take the form of a desktop computer with a display that graphically shows representations of the input and result data, and with a keyboard that enables the user to move files and execute processing software. LAN 104 provides high-speed communication between multi-processor computers 106 and with personal workstation 102. The LAN 104 may take the form of an Ethernet network.

Multi-processor computer(s) 106 provide parallel processing capability to enable suitably prompt processing of the input data to derive the results data. Each computer 106 includes multiple processors 112, distributed memory 114, an internal bus 116, a SAN interface 118, and a LAN interface 120. Each processor 112 operates on allocated tasks to solve a portion of the overall problem and contribute to at least a portion of the overall results. Associated with each processor 112 is a distributed memory module 114 that stores application software and a working data set for the processors' use. Internal bus 116 provides inter-processor communication and communication to the SAN or LAN networks via the corresponding interfaces 118, 120. Communication between processors in different computers 106 can be provided by LAN 104.

SAN 108 provides high-speed access to shared storage devices 110. The SAN 108 may take the form of, e.g., a Fibrechannel or Infiniband network. Shared storage units 110 may be large, stand-alone information storage units that employ magnetic disk media for nonvolatile data storage. To improve data access speed and reliability, the shared storage units 110 may be configured as a redundant disk array ("RAID").

The processors 112 cooperatively execute geologic modeling software stored in the distributed memory and/or on the shared storage units, which configures to processors to retrieve measurement data and stored model information from the shared storage units 110, operate on the retrieved data and information to implement the modeling methods and improvements disclosed herein, and to store the resulting geologic models on the shared storage units 110 for future use. Such future use includes visualization methods to convey model information to users, simulation of reservoir fluid movements, and evaluation of well placement and production strategies, enabling users to select sites for drillers to direct boreholes, complete wells, and produce reservoir fluids in an efficient manner.

Figure 2:
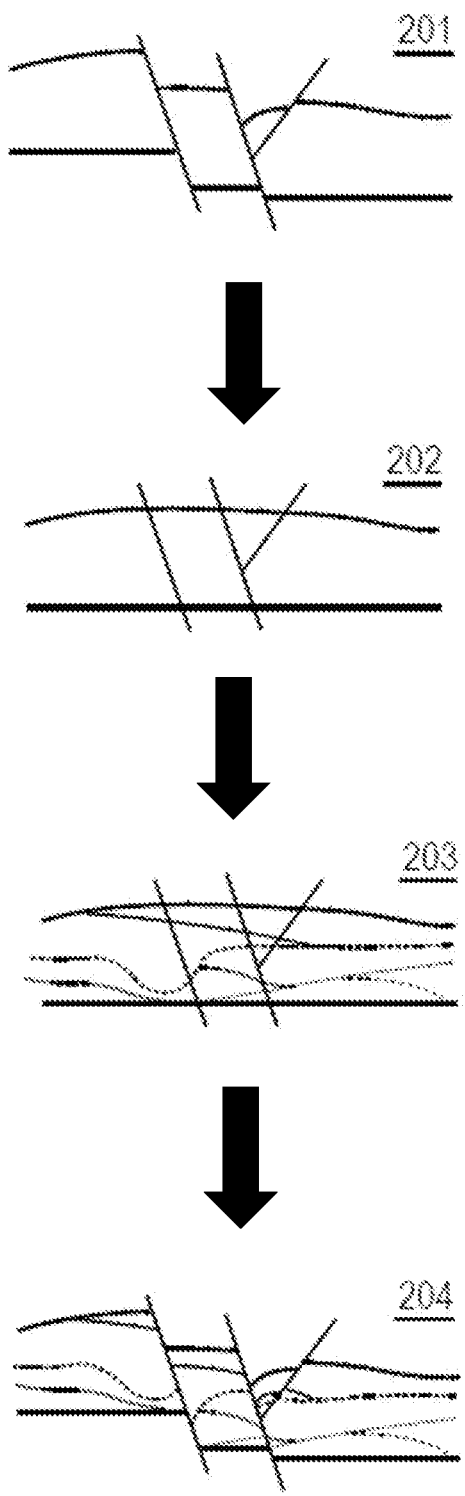
FIG. 2 shows an illustrative sequence of geologic model creation.

FIG. 2 provides an overview of the geologic model creation process. The process may begin with obtaining seismic survey data, migrating and/or inverting the traces to detect large-scale subsurface structures, and interpreting the migrated/inverted trace data to clearly define the formation boundaries. An example of defined formation boundaries is represented by physical measurement model 201. (Though a 2D representation is shown here for easy illustration, in practice the physical model usually has three spatial dimensions.) As seismic trace data can be sensitive to fluid porosity and density, the physical model may associate estimated rock properties with each point in the physical volume being modeled. The log data from any wells located in the modeled volume may further be used to estimate rock properties where the wells are positioned, and may be rigged or otherwise extrapolated to inter-well spaces. As previously mentioned, however, such models may be incomplete in some fashion, e.g., by having insufficient resolution to support simulation of reservoir fluid movement, and hence be unable to be used to properly evaluate well placement and production strategies.

Before completing the model via user-specified properties for each geobody or computer-generated geologic feature templates that "fill in" additional detail consistent with the seismic-derived structure information, it is desirable to map the physical measurement model 201 from the physical space, which may have faults or other geological discontinuities, to a continuous design space where such discontinuities have been "healed". FIG. 2 shows an illustrative design-space measurement model 202 that may result.

It is this design space that is generally preferred for geologic model completion, as such efforts are normally performed on a geobody-by-geobody basis, and the design space generally has fewer geobodies than the faulted physical space. In some embodiments, geologic modeling systems speculatively introduce geologic features and condition them to match the measurement data, producing a design space geologic model 203 having finer structural details.

If the physical-to-design space mapping is then applied in reverse, a physical-space geologic model 204 is obtained having more finely-detailed formation structure, which yet remains consistent with the measured structural information. Because the filled-in information is based on physical models of geologic processes, the geologic models may tend to be more realistic than statistically-based extrapolations.

Figure 3A:
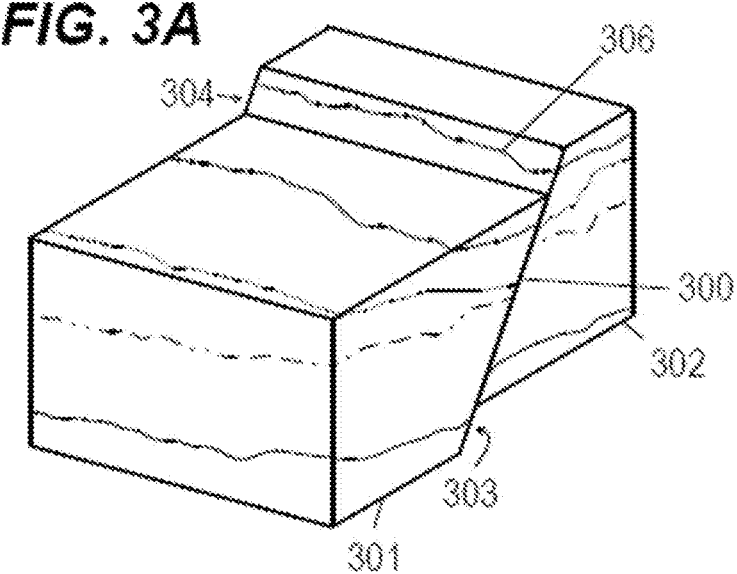
FIGS. 3A and 3B provide a perspective view of a slip fault in a volumetric model block.
Figure 3B:
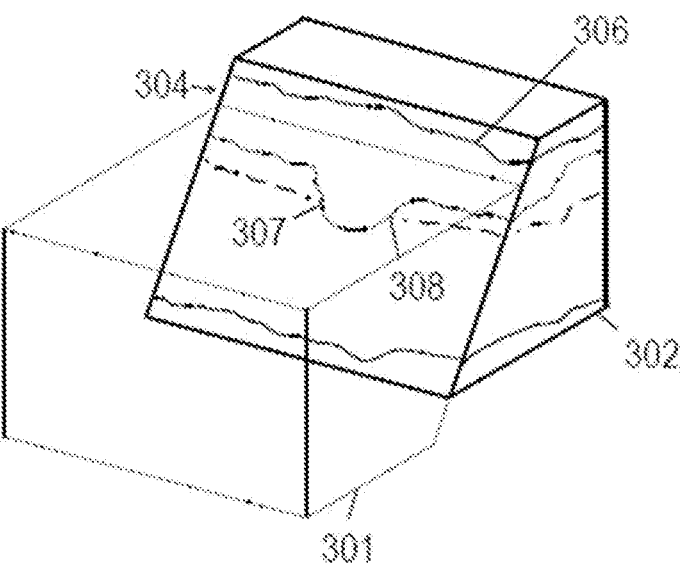

FIG. 3A is a perspective view of an illustrative slip fault 300 causing a discontinuity between a first volumetric model block 301 and a second block 302. Fault 300 forms a first fault face 303 on block 301 and a second fault face 304 on block 302. The formation layers in each block form horizons that may be shown as traces 306 along each fault face. FIG. 3B shows the view with block 301 rendered transparent to reveal fault face 304. When a formation layer pinch-out 307, 308 intersects the fault 300, it is desirable for the pinch out points on each face of the fault to be aligned.

The geologic model represents formation properties throughout a physical volume, but this representation can take many forms. For example, the subsurface model may include a framework of objects, such as faults and horizons, and may include a 3D mesh or grid of nodes to divide the subsurface model into cells (aka "blocks" or "volumetric elements"). Material properties, such as rock properties (e.g., permeability and/or porosity) may be represented as continuous volumes or unfaulted volumes in the design space, while the physical space may be represented as discontinuous volumes or faulted volumes (e.g., contain volume discontinuities, such as post-depositional faults). The present techniques may be utilized to lessen or remove such discontinuities and construct a design model having a continuous volume or unfaulted volume.

The grid may be used in subsurface models for hydrocarbon operations, such as reservoir simulation studies in reservoir exploration and/or production stages, as well as for representing a geologic model description of a reservoir structure and material properties. The grid may also be used for numerical discretization of partial differential equations to simulate fluid flow or wave propagation through the modelled space.

Figure 4A:
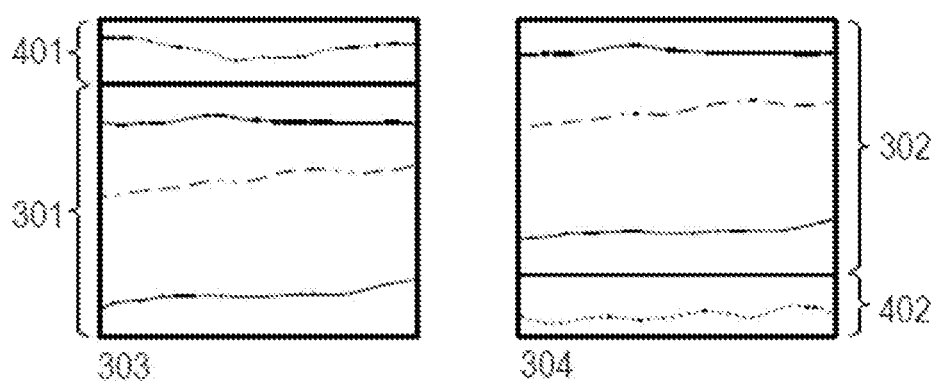
FIG. 4A shows horizons on the two faces of an illustrative slip fault.

The geologic model of FIGS. 3A and 3B are simplified for illustrative purposes. In practice, the fault need not be rectangular or planar, and indeed may have a complex geometry, though it is expected that the fault faces can be represented in a two-dimensional space. Moreover, additional volumes would normally be present above and below the illustrated blocks 301, 302. As shown in FIG. 4A, the fault itself may be used to define the extent of each face to be aligned, rather than the blocks or geobodies intersected by the fault.

FIG. 4A shows fault face 303 (as viewed from within block 301) and fault face 304 (as viewed from the fault, looking towards block 302). (Aligning the views in this fashion facilitates visual comparison of the faces.) Fault face 303 extends above block 301 into an overlying block 401, while fault face 304 extends below block 302 into an underlying block 402. The horizon traces are shown and may be used (alone or in combination with other factors) to facilitate a realignment of the faces to provide continuity in the design space.

Figure 4B:
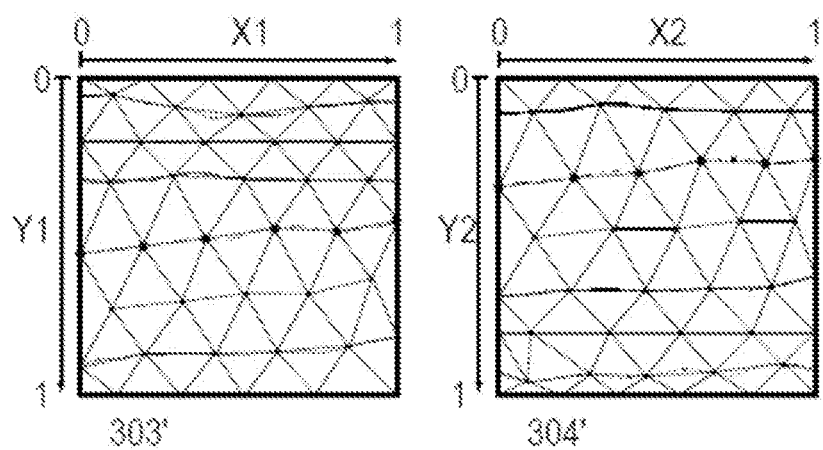
FIG. 4B shows an illustrative mesh triangulation of the fault faces.

In at least some embodiments, the realignment involves the use of a mesh of nodes on each fault face as shown in FIG. 4B. Mesh 303' represents face 303 and mesh 304' represents face 304. In many cases, the geologic model will already have suitable 2D meshes that can be extracted from the volumetric mesh representation, but where they are not already available, any suitable tessellation technique may be employed. The mesh may be designed to include nodes distributed along the horizon traces on each fault face, with intermediate nodes provided as needed to till in overly-large spans between horizons. The nodes may be connected by edges in a triangular, square, or irregular polygon arrangement.

The nodes may be "parameterized", meaning that each node is assigned a set of coordinate values in a two-dimensional normalized parameter space. In at least some embodiments, the parameter space coordinate values are assigned in a monotonic fashion (i.e., gradually increasing or gradually decreasing as the fault face is traversed from one side to the other) and are limited to values between zero and one. The value assignments are made with an intent to assign corresponding values to the nodes in each face that are to be aligned or at least drawn closer to each other. In other words, the parameter values are employed as constraints on the manner in which the fault faces are re-aligned to reduce or eliminate discontinuities.

To avoid a tedious process of visually comparing the nodes in each fault face and manually assigning parameter-space coordinate values, certain principles may be applied to at least partly automate the process. For example, a user may assign parameter-space coordinate values at the corners of the fault faces and to any nodes (especially any edge nodes) positioned at particularly distinctive features (e.g., horizon traces, pinch-outs, geobody centerlines) and rely on the computer to compute parameter-space coordinate values for the other nodes. In at least some cases, the computation involves numerically solving a system of partial differential equations constrained by those coordinate values which have been assigned. One suitable system of partial differential equations is Poisson's equations for diffusion.

In at least some cases, the extrapolation also or alternatively involves assigning consistent first-axis coordinate (parameter space) values along the length of any given horizon trace. Where (after accounting for overlap) the number of horizon traces present on the fault faces is N, the first-axis coordinate value increment (or decrement) between nodes for adjacent horizon traces may be 1/(N+1). This computation may be performed prior to the numerical solving of the partial differential equations.

If any of the horizon traces represents multiple horizons due to a pinch-out near the fault (the nodes in FIG. 4B represented by big dots are positioned along one such trace), an extra penalty may be associated with any mismatch between these horizons, so as to enforce continuity across the fault.

Another method to regulate the parameter value is to use polyline distance to assign parameter values before solving the partial differential equations. For example, a polyline can first be identified on the intersections of a horizon and fault, and then parameter values are assigned to the two ends of at the polyline. Then, parameter values are assigned to the rest of the nodes of each polyline according to the distance from the node to the two ends of polyline. For example, each parameter value may be made to be linearly proportionate to the distance to the end of the polyline. After the parameter values are assigned, the partial differential equations may be solved using the previously assigned parameters as boundary conditions and, thus, obtain values for the unassigned nodes.

Figure 4C:
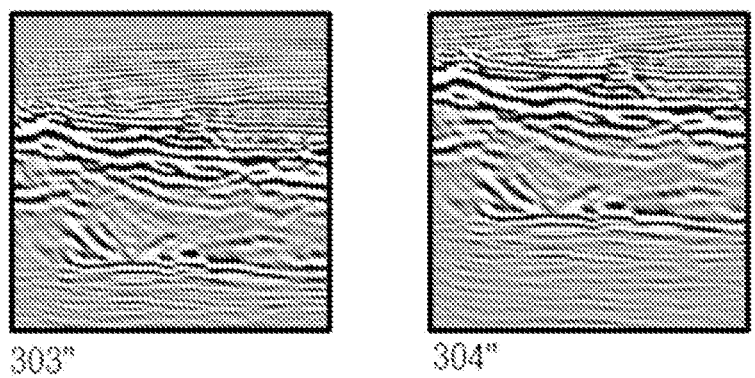
FIG. 4C shows illustrative seismic image projections on the fault faces.

Another factor that may be used to improve continuity is the (optionally migrated or inverted) seismic image data associated with each fault face. In FIG. 4C, seismic image 303" is a vertical or projected slice of slightly-offset seismic image data onto fault face 303, while seismic image 304" is vertical or projected seismic image data from a slight offset in the opposite direction onto fault face 304. In other words, seismic image data 303", 304" may be associated with blocks 301, 302 respectively. Offset seismic image data may be desirable due to the limited resolution associated with seismic surveys, limiting the usefulness of this technique if image data is sought coincident at the fault location.

Figure 4D:
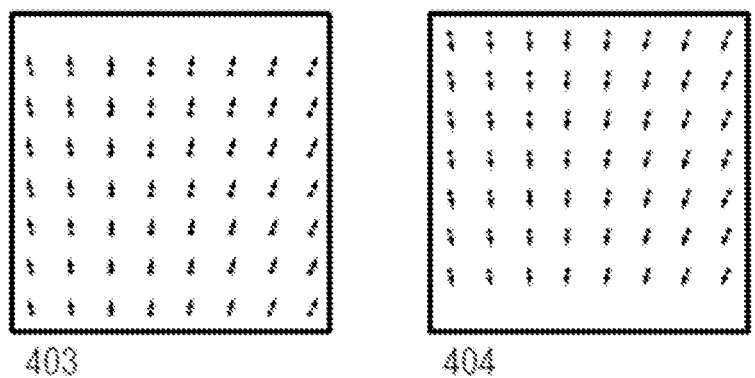
FIG. 4D shows illustrative correspondence maps for the fault faces.

In at least some embodiments, the system applies image processing to compare the images for the two faces and derive for each pixel, block, or node, a correspondence vector indicating which portions of the images correlate best. FIG. 4D shows an illustrative correspondence map that may result from such processing as applied to FIG. 4C. The correspondence map is shown as vectors for each block of the image where a sufficient correspondence can be found. (The vectors are scaled by 0.4 for readability.) Maps 403, 404, correspond to fault faces 303, 304, respectively.

Figure 5:
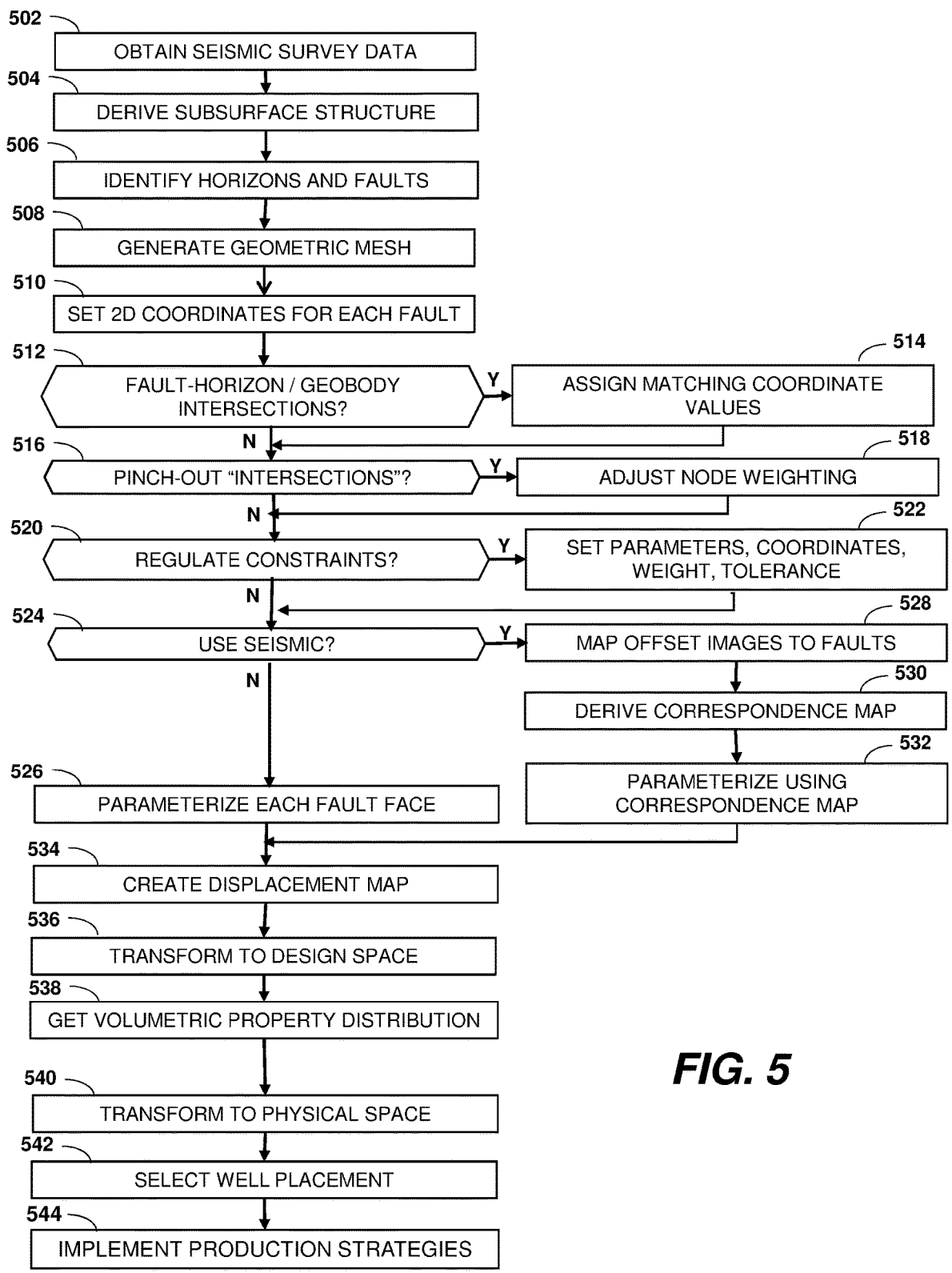
FIG. 5 is a flow diagram of an illustrative geologic modeling method having constrained restoration of depositional space.

With this context in mind, we turn to FIG. 5, which is a flow diagram of an illustrative geologic modeling method having constrained restoration of depositional space. It begins in block 502 with the system obtaining seismic survey trace signal data pertaining to a region of interest in block 504, the system migrates and/or inverts the seismic survey traces to derive at least a high-level picture of the subsurface structure, usually embodied as a volumetric property distribution model in the physical space. In block 506, the physical space model is examined to "interpret" the data, i.e., to identify horizons representing formation boundaries, faults, and any other discernable structures. While this interpretation can be automated to at least some degree, the current industry practice is to have a geologist or other professional supervise the interpretation process or to perform the interpretation manually.

In block 508, the system tessellates the horizons and faults (and any other discernable structures), and may further mesh the data volume into discretized volumetric elements so as to provide a more compact and useful representation of the subsurface structures. For example, each mesh element in a 3D grid may be a tetrahedron, and this geometrical classification may be considered the shape or type of the mesh element. A variety of known techniques exist for tetrahedral mesh generation in a volumetric domain (e.g., Delaunay tetrahedralization, or advancing front methods), which may be used in the present techniques. However, the present techniques are not limited to tetrahedral grids, as any finite-element grid, or even hybrid grid of several element types, such as prisms and tetrahedrals, may be utilized. To facilitate the mapping process, it may be preferable that the initial grid be cut or non-conforming across discontinuities, which may be performed by mirroring grid faces on the discontinuities if the generated grid is conforming. Each face of the various faults is separately tessellated, as discussed previously with respect to FIG. 4B.

In block 510, the system establishes a 2D parameter-space coordinate system for each fault face (i.e., each side of each fault). Conceptually, the parameter-space coordinate system can be spatially contoured and conformed to the fault's geometry. The parameter space coordinate axes could be arbitrarily oriented, but preferably a first of the axes maps to a substantially vertical direction, or perhaps along the fault in a direction substantially perpendicular to the horizon traces. The second of the two coordinate axes may then be mapped substantially perpendicular to the first.

In block 512, the system checks each fault for intersections with horizons or other detected geobodies. For each such intersection with a given fault, the system operates in block 514 to identify corresponding traces on each face of the fault and to assign corresponding parameter-space coordinate values to the corresponding nodes on each face. As previously discussed, the system may assign consistent Y-coordinate (parameter-space) values along the length of each horizon trace, with regular increments for the parameter space values of adjacent horizons. The identification and assignment may be user-guided, or the system may rely on a pattern-matching technique to identify the correspondence between traces.

In block 516, the system checks each face of the fault for pinch-out point intersections. Where pinch-outs intersect the fault, it is desirable to ensure that they are aligned. Thus, in block 518, the system ensures that matching coordinate values are assigned to the nodes (or the intersection points, if the pinch-out intersections do not coincide with nodes) representing the pinch-out points. The system may alternatively increase the mismatch penalty weighting for these nodes or intersection points to enforce their continuity in design space.

In block 520, the system determines whether there are any other constraints to be regulated. For example, the user may desire to include user-defined constraints. Examples of potential user-defined constraints include fault-intersecting features represented by polylines (which may represent central axes of geobodies, thalwegs, contacts, pinchout lines, etc.), surfaces (which may represent an environment of deposition, a channel, etc.), and bodies (which may represent reefs, salt bodies, sand or other sedimentary intrusions, lobes, etc.), when it is desirable for the fault-intersecting features to be continuous in design space. The user may specify a correspondence between the appropriate nodes or intersection points of each fault face, and may further specify a mismatch penalty weighting or maximum allowed mismatch (i.e., an alignment tolerance). Similarly, the user may identify other features or nodes on each face that are to be aligned. As yet another example, the user may specify limits on the deformability or "stretchiness" of the model blocks. One technique for implementing such limitations is to specify a maximum allowed gradient in the mapping from physical space to design space, or a maximum allowed derivative in the displacement vector maps for each fault face.

As another example, the user may regulate the parameter value based on the distance (length) of the polyline. In such an example, the user would first identify at least one poly line at the intersection of a horizon and a fault. A parameter value is then assigned to each of the two ends of the identified polyline. Parameter values are then assigned to the rest of the nodes on the identified polyline based on the distance of the node to the ends of the polyline.

In block 522, the system responsively sets the parameters; coordinates associated with the appropriate nodes; adjusts the appropriate mismatch penalty weights; and/or sets the appropriate requirements for an acceptable mapping function.

In block 524, the system checks whether seismic image data is to be used for facilitating alignment. If not, then in block 526 the system takes the assigned 2D parameter space coordinate values for nodes on each face and extrapolates to fill in the parameter space coordinate values for the rest of the nodes on each face, thereby fully parameterizing each fault face. While the extrapolation may be performed with linear interpolation, it may be preferred to take the assigned parameter values as constraints and numerically solve Poisson's equations for diffusion (or other conservation-based partial differential equations) to derive parameter-space values for the remaining nodes of each fault. Such solutions tend to exhibit better smoothness than linear interpolation. Alternatively, standard surface parameterization schemes (such as discrete conformal or harmonic mappings as taught by Floater and Hormann, "Surface Parameterization: a tutorial and survey", pp. 157-186 of Advances in multiresolution for geometric modelling©2005 Springer Verlag) can be applied with reasonable speed to obtain parameter values with distortion characteristics better than what linear interpolation provides.

Otherwise, in block 528 the system extracts a seismic image for each fault face. In some embodiments, the system creates offset surfaces parallel to the fault which slice through the seismic image volume. The system maps the seismic image data from these offset surfaces to the corresponding fault face. (FIG. 4C provides an example of this.) The seismic image data may be reflection intensity, seismic trace amplitude, or a formation property derived from the seismic survey data. In any event, it is expected that the number of pixels in seismic image data for each face will far exceed the number of nodes typical of the tessellated mesh representation for each face.

In block 530, the system derives a correspondence map between the faces for each fault. Any suitable image correlation or registration technique from the literature may be employed to determine a correspondence vector for each pixel, block of image pixels, or each mesh node. FIG. 4D shows an illustrative correspondence vector map derived using Digital Image Correlation computed via fast Fourier transforms. Another correspondence vector determination technique can be found in U.S. Pat. No. 9,022,129 entitled "Tracking geologic objects and detecting geologic anomalies in exploration seismic data volume".

In block 532, the system extrapolates from assigned coordinate values to fully parameterize one or both fault faces of each fault, employing the correspondence map to ensure that matching parameter space coordinate values are applied to the corresponding portions of the fault faces. In some embodiments, one fault face is fully parameterized and the correspondence map is used to map the parameter space coordinates to the other fault face. In other embodiments, both fault faces are parameterized and the parameter-space coordinate values of corresponding face nodes are combined to provide matching values while preserving monotonicity. In still other embodiments, the diffusion equations for both faces are solved concurrently while using the correspondence map as additional constraints on the solution.

In block 534, the system employs the fully parameterized fault faces to create a displacement map, i.e., a displacement vector for each mesh node in the physical space geologic model. The displacement vectors collectively specify a mapping of each node in physical space to a node in design space, the displacement vectors being chosen to significantly lessen or eliminate discontinuities with minimal distortion in the volumetric blocks or subvolumes delineated by horizons or faults. In some embodiments, creating the displacement map may further include solving one of an energy optimization equation and conservation law equation based on parameterized nodes on the fault faces to relate points in the physical space to points in the design space. For example, one or more conservation principles may be applied to determine optimized displacement vectors, subject to suitable rock and interface treatments on the two fault faces that serve to improve continuity. Suitable rock and interface treatments include mismatch penalty methods, Nitsche methods, and discontinuous Galerkin methods. In each case, the mismatch calculations can be weighted by node, enabling any nodes deemed critical to be given more weight than others. Specific examples are discussed with reference to equations e1-e11 in U.S. Pat. No. 10,107,938, entitled "Managing Discontinuities in Geologic Models".

In one or more embodiments, the displacement map may be updated after applying conservation principles to determine initially optimized displacement vectors. For example, the process may comprise iteratively solving the energy optimization equations or conservation law equations to minimize fault throw in the model.

In block 536, the system uses the displacement map to transform the physical space geologic model into a design space geologic model. In block 538, the system uses the design space geologic model to obtain the volumetric distribution of formation properties, which may be substantially more detailed in terms of structures and gradients than purely seismic-data based models. The volumetric distributions determination may be manually specified or guided by a user, or may be automatically generated by the computer, perhaps using stochastically-generated structures that are conditioned to fit the larger-scale structure derived from seismic measurements. In either case, the process may be facilitated by the reduced number of geobodies resulting from the improved continuity in design space.

In block 540, the system transforms the detailed design space geologic model into a detailed physical space geologic model, using the displacement map to reverse the original transformation. In block 542, the detailed physical space model may be used to evaluate and optimize various well placement and reservoir production strategies, and based thereon, to select placements for drilling wells to develop and produce hydrocarbons or other minerals from the region of interest.

The populated geologic model may be outputted. The outputting of the populated geologic model may be displayed on a monitor and/or may be stored in memory or nonvolatile information storage of a computer system. Further, the populated geologic model may be used to perform activities for hydrocarbon operations. The hydrocarbon operations may include hydrocarbon exploration operations and/or hydrocarbon production operations. For example, the populated geologic model may be used to adjust hydrocarbon exploration operations. For example, the populated geologic model may be used to estimate or adjust reserves forecasts, reserves estimations and/or well performance prediction. Further, as another example, the populated geologic model may be used to adjust hydrocarbon production operations. In particular, the populated geologic model may be used to model the subsurface region to install or modify a well or completion, to modify or adjust drilling operations, to mitigate the contribution in the current or future wells by decreasing fracture penetration, and/or to install or modify a production facility for the production of hydrocarbons from the production intervals that provide access to the hydrocarbons in the subsurface formation. The production facility may include one or more units to process and manage the flow of production fluids, such as hydrocarbons and/or water, from the formation. To access the production intervals, the production facility may be coupled to a tree and various control valves via a control umbilical, production tubing for passing fluids from the tree to the production facility, control tubing for hydraulic or electrical devices, and a control cable for communicating with other devices within the wellbore. The strategy may adjust the well locations, fracture depths and patterns, etc.

Beneficially, this method provides an enhancement in the production and exploration of hydrocarbons. In particular, the method may be utilized to enhance assignment of material properties to geologic models by enabling continuous functions to model properties in an unfaulted volume with discontinuities effectively removed.

Though the operations shown and described in the flow diagrams are treated as being sequential for explanatory purposes, in practice the method may be carried out by multiple processors operating concurrently and perhaps even speculatively to enable out-of-order operations. The sequential discussion is not meant to be limiting.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.).

Furthermore, as will be apparent to one of ordinary skill in the relevant art, the modules, features, attributes, methodologies, and other aspects of the present disclosure can be implemented as software, hardware, firmware or any combination of the three. Of course, wherever a component of the present disclosure is implemented as software, the component can be implemented as a standalone program, as part of a larger program, as a plurality of separate programs, as a statically or dynamically linked library, as a kernel loadable module, as a device driver, and/or in any other way known to those of skill in the art of computer programming. The software, hardware, or firmware embodying the disclosed methods may implement machine-readable logic, such that a set of instructions or code residing in memory, when executed, causes one or more processors to employ the other components of a computer system as needed to perform the disclosed methods.

These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A geologic modeling method that comprises:
   obtaining a geologic model representing a faulted subsurface region in physical space;
   associating a seismic image with each face of at least one fault in the subsurface region;
   determining a correspondence map between the seismic images for said at least one fault by comparing an offset seismic image of each face against an offset seismic image of a corresponding face to produce a correspondence vector indicative of a correspondence between each face and the corresponding face;

parameterizing the faces using the correspondence map to match parameter value assignments for corresponding portions of the faces, wherein said parameterizing comprises:
- assigning matching parameter values to nodes along corresponding intersections of a horizon with said at least one fault;
- identifying intersection points of pinch-outs with each face of said at least one fault; and
- using a constraint to compel matching parameter values for the pinch-out intersection points on each face of said at least one fault;

creating a displacement map that, when applied to the geologic model, draws matching parameter values together to align the corresponding portions of the faces;

applying the displacement map to the geologic model to create a design space model;

modifying the design space model;

applying the displacement map in reverse to the modified design space model to obtain a modified geologic model; and outputting the modified geologic model.

2. The method of claim 1, wherein said associated comprises extracting pixel values from where offset surfaces intersect a volumetric model, the offset surfaces extending parallel to said at least one fault.

3. The method of claim 2, wherein the pixel values represent reflection intensity derived from migrated seismic survey traces.

4. The method of claim 1, wherein said determining comprises digital image correlation via fast Fourier transforms.

5. The method of claim 1, wherein said parameterizing comprises:
solving a diffusion equation to assign parameter values to any nodes without assigned parameter values on at least one face of said at least one fault.

6. The method of claim 5, wherein said parameterizing further includes:
- identifying intersection points on a geobody's central axis with each face of said at least one fault; and
- using a constraint to compel matching parameter values for the central axis intersection points on each face of said at least one fault.

7. The method of claim 1, wherein said parameterizing comprises:
- identifying at least one polyline on the intersections of a horizon and fault;
- assigning a parameter value to each of the two ends of the identified polyline;
- assigning a parameter value to the rest of the nodes on the polyline based on the distance of each node to the two ends of the identified polyline; and
- solving a diffusion equation to assign parameter values to any nodes without assigned parameter values on at least one face of said at least one fault.

8. The method of claim 1, wherein said creating a displacement map includes solving one of an energy optimization equation and conservation law equation based on parameterized nodes on the fault faces to relate points in the physical space to points in the design space.

9. The method of claim 8, further comprising iteratively solving the energy optimization equation or conservation law equation to reduce fault throw.

10. The method of claim 1
wherein said parameterizing further comprises:
identifying intersection points of at least one central axis of a geobody with each face of said at least one fault; and
wherein said creating comprises:
increasing a mismatch penalty weight for said intersection points on each face of said at least one fault.

11. The method of claim 1, wherein said modifying comprises assigning values of one or more formation properties to geobodies in the design space.

12. A geologic modeling system that comprises:
a memory having geologic modeling software; and
one or more processors coupled to the memory to execute the geologic modeling software, the software causing the one or more processors to perform operations including:
obtaining a geologic model representing a faulted subsurface region in physical space;
associating a seismic image with each face of at least one fault in the subsurface region;
determining a correspondence map between the seismic images for said at least one fault by comparing an offset seismic image of each face against an offset seismic image of a corresponding face to produce a correspondence vector indicative of a correspondence between each face and the corresponding face;
parameterizing the faces using the correspondence map to match parameter value assignments for corresponding portions of the faces, wherein said parameterizing comprises:
- assigning matching parameter values to nodes along corresponding intersections of a horizon with said at least one fault;
- identifying intersection points of a pinch-out with each face of said at least one fault; and
- using a constraint to compel matching parameter values for the pinch-out intersection points;

creating a displacement map that, when applied to the geologic model, draws together matching parameter values to aligning the corresponding portions of the faces;

applying the displacement map to the geologic model to create a design space model;

modifying the design space model;

applying the displacement map in reverse to the modified design space model to obtain a modified geologic model suitable for evaluating one or more well placement and production strategies; and outputting the modified geologic model.

13. The system of claim 12, wherein said associating comprises: extracting pixel values from where offset surfaces intersect a volumetric model, the offset surfaces extending parallel to said at least one fault.

14. The system of claim 13, wherein the pixel values represent reflection intensity derived from migrated seismic survey traces.

15. The system of claim 12, wherein said determining comprises: digital image correlation via fast Fourier transforms.

16. The system of claim 12, wherein said parameterizing comprises:

solving a diffusion equation to assign parameter values to any nodes without assigned parameter values on at least one face of said at least one fault.

17. The system of claim 12, wherein said parameterizing comprises:
identifying at least one polyline on the intersections of a horizon and fault;
assigning a parameter value to each of the two ends of the identified polyline;
assigning a parameter value to the rest of the nodes on the poly line based on the distance of each node to the two ends of the identified polyline; and
solving a diffusion equation to assign parameter values to any nodes without assigned parameter values on at least one face of said at least one fault.

18. The system of claim 16, wherein said parameterizing further comprises:
identifying intersection points of each face of the at least one fault with a polyline, surface, or body representing a fault-intersecting feature; and
using a constraint to compel matching parameter values for the intersection points.

19. The system of claim 16, wherein creating a displacement map comprises solving one of an energy optimization equation and conservation law equation based on parameterized nodes on the fault faces to relate points in the physical space to points in the design space.

20. A non-transitory information storage product having computer readable program code embodied therein, which when executed implements a geological modeling method that comprises:
obtaining a geologic model representing a faulted subsurface region in physical space;
associating a seismic image with each face of at least one fault in the subsurface region;
determining a correspondence map between the seismic images for said at least one fault by comparing an offset seismic image of each face against an offset seismic image of a corresponding face to produce a correspondence vector indicative of a correspondence between each face and the corresponding face;
parameterizing the faces using the correspondence map to match parameter value assignments for corresponding portions of the faces, wherein said parameterizing comprises:
assigning matching parameter values to nodes along corresponding intersections of a horizon with said at least one fault;
identifying intersection points of a pinch-out with each face of said at least one fault; and
using a constraint to compel matching parameter values for the pinch-out intersection points;
creating a displacement map that when applied to the geologic model, draws together matching parameter values to align the corresponding portions of the faces;
applying the displacement map to the geologic model to create a design space model;
modifying the design space model;
applying the displacement map in reverse to the modified design space model to obtain a modified geologic model suitable for evaluating one or more well placement and production strategies; and
outputting the modified geologic model.

21. The product of claim 20, wherein said associating comprises: extracting pixel values from where offset surfaces intersect a volumetric model, the offset surfaces extending parallel to said at least one fault, the pixel values representing reflection intensity derived from migrated seismic survey traces.

22. The product of claim 20, wherein said determining comprises: digital image correlation via fast Fourier transforms.

23. The product of claim 20, wherein said parameterizing comprises:
solving a diffusion equation to assign parameter values to any nodes without assigned parameter values on at least one face of said at least one fault; and
wherein said creating comprises solving one of an energy optimization equation and conservation law equation based on parameterized nodes on the fault faces to relate points in the physical space to points in the design space.

24. The product of claim 20,
wherein said parameterizing comprises:
identifying at least one polyline on the intersections of a horizon and fault;
assigning a parameter value to each of the two ends of the identified polyline;
assigning a parameter value to the rest of the nodes on the polyline based on the distance of each node to the two ends of the identified polyline; and
solving a diffusion equation to assign parameter values to any nodes without assigned parameter values on at least one face of said at least one fault.

25. The product of claim 23, wherein said parameterizing further comprises:
identifying intersection points of each face of the at least one fault with a polyline, surface, or body representing a fault-intersecting feature; and
using a constraint to compel matching parameter values for the intersection points.

* * * * *